United States Patent

Meyer

[11] Patent Number: 6,142,185
[45] Date of Patent: Nov. 7, 2000

[54] VALVE BLOCK

[75] Inventor: Willi Meyer, Effretikon, Switzerland

[73] Assignee: Emhart Glass S.A., Cham, Switzerland

[21] Appl. No.: 09/120,012

[22] Filed: Jul. 21, 1998

[30] Foreign Application Priority Data

Jul. 24, 1997 [GB] United Kingdom .................. 9715511

[51] Int. Cl.[7] .................................................. F16K 27/00
[52] U.S. Cl. .................. 137/884; 137/271; 137/596.16; 137/614.17
[58] Field of Search ............................. 137/884, 596.16, 137/271

[56] References Cited

U.S. PATENT DOCUMENTS

| 3,918,489 | 11/1975 | Foster et al. ................... 137/883 X |
| 4,082,108 | 4/1978 | Dininio ........................ 137/271 X |
| 4,293,004 | 10/1981 | Lowe ........................ 137/596.16 X |
| 4,446,888 | 5/1984 | Heredia De La Paz et al. .. 137/884 X |
| 4,478,241 | 10/1984 | Cardennes-Franco et al. .... 137/884 X |
| 5,447,176 | 9/1995 | Asou et al. ...................... 137/884 X |
| 5,582,209 | 12/1996 | Borbone ...................... 137/596.16 X |
| 5,699,834 | 12/1997 | Hayashi et al. ........................ 137/884 |

Primary Examiner—Stephen M. Hepperle
Assistant Examiner—John Bastianelli
Attorney, Agent, or Firm—Spencer T. Smith

[57] ABSTRACT

A valve block for a glass container forming machine comprises a frame supporting a plurality of valve stations. Each of the stations is provided with a valve. The frame comprises pressure passages connected to supplies of compressed air, and control sleeves at each station determine which supply is available to the valve at that station. The valves and the control sleeves are all accessible from one face of the valve block.

17 Claims, 4 Drawing Sheets

VALVE BLOCK

This invention relates to valve blocks.

BACKGROUND OF THE INVENTION

Conventional glassware forming machines of the I.S. or individual section type comprise a plurality of sections, mechanically similar, operating out of phase with each other to produce a continuous stream of glass containers. Each section comprises a number of pneumatically operated mechanisms and each such mechanism comprises one or more pneumatic valves to control its operating sequence. Such pneumatic valves are normally controlled by solenoid operated pilot valves, which solenoid operated valves are controlled by a computerised control system for the machine.

Conveniently the pneumatic valves and the associated solenoid operated pilot valves for a single section are mounted in an array in a valve block which is mounted on the section, and significant constraints are placed upon the design of such valve blocks by the need to accommodate it in the space available in the width of one section and also by the need to make it reasonably accessible for repair and adjustment.

A typical valve block is shown in U.S. Pat. No. 3,918,489. This valve block comprises two castings secured together, one casting supporting the solenoid operated pilot valves in an array comprising two lines of such valves, and the other casting supporting the pneumatic valves associated with the pilot valves. To gain access to the pneumatic valves, for repair or adjustment, it is necessary to separate the two castings, which is a very time consuming operation.

It is one of the aspects of the present invention to provide a valve block which is economical in construction and in which access to component parts for repair or modification is facilitated.

SUMMARY OF THE INVENTION

The present invention provides a valve block comprising
a frame which provides a plurality of valve stations arranged in one or more rows, the frame having a front face and a rear face which provide a front face and a rear face of each valve station, said frame also comprising an exhaust passage, a first pressure passage and a second pressure passage all extending lengthwise through all the valve stations in one row,
and a control valve associated with each valve station
wherein each said valve station comprises
an inlet passage extending from said rear face to said front face of the station across said two pressure passages
a supply passage extending from said rear face to said front face of the station
a control sleeve in said inlet passage which connects a selected one only of the pressure passages to an inlet of said control valve which control sleeve is accessible from said front face of said valve station
and wherein said valve associated with said station is mounted on said front face of said station
and throttle valves for controlling the passage of air to said valve from said inlet passage and from said valve to said exhaust passage are also mounted on said front face of said station.

The present invention also provides a valve block comprising
a frame which provides a plurality of valve stations arranged in one or more rows, said frame having a front face and a rear face which provide a front face and a rear face of each valve station, said frame also comprising an exhaust passage, a first pressure passage and a second pressure passage all extending lengthwise through all the valve stations in one row,
a control valve associated with each valve station and means for connecting the valve to the exhaust passage and selectively to one of the pressure passages
wherein
each said valve station comprises
an inlet passage extending from said rear face to said front face of the station across said two pressure passages
a supply passage extending from said rear face to said front face of the station
a valve inlet passage extending from the front face of the station and connected to said inlet passage
a valve exhaust passage extending from the front face of the station and connected to said exhaust passage
a control sleeve in said inlet passage which connects a selected one only of said pressure passages to said valve inlet passage
the control valve associated with said valve station being mounted on said front face of said valve station and comprising air passages which mate with the entrances in said front face of said supply passage, said valve inlet passage and said valve exhaust passage.

The present invention further provides a valve block comprising
a frame which provides a plurality of valve stations arranged in one or more rows, said frame having a front face and a rear face which provide a front face and a rear face of each said valve station and said frame also comprising an exhaust passage, a first pressure passage and a second pressure passage all extending lengthwise through all the valve stations in one row,
and a control valve associated with each valve station, wherein
each said valve station comprises
an inlet passage extending from said rear face to said front face of the station across said two pressure passages
a supply passage extending from said rear face to said front face of the station
a valve inlet passage extending from the front face of the station and connected to said inlet passage
a valve exhaust passage extending from the front face of the station and connected to said exhaust passage
a control sleeve in said inlet passage which connects a selected one only of said pressure passages to said valve inlet passage
a first stud arrangement mounted on said front face of said station and extending into said inlet passage to hold said control sleeve in position
a second stud arrangement mounted on the front face of the station
the control valve being located on the two stud arrangements and comprising air passages which mate with the entrances in said front face of said supply passage, said valve inlet passage and said valve exhaust passage.

DETAILED DESCRIPTION OF THE INVENTION

There now follows a description, to be read with reference to the accompanying drawings, of a valve block embodying the invention.

In the accompanying drawings.

Figure 1:
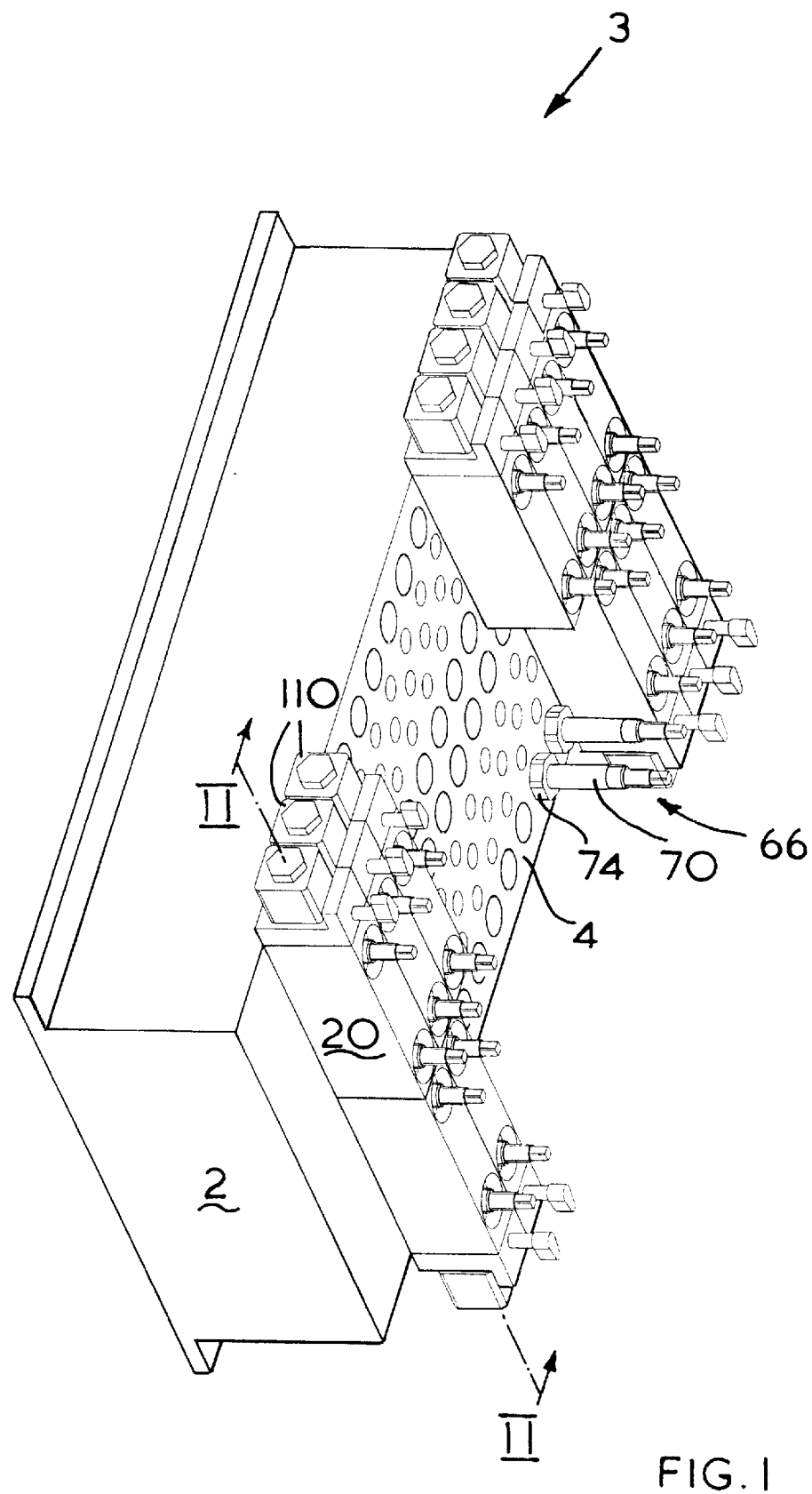
FIG. 1 shows a perspective view, with some parts removed, of a valve block embodying the invention.

The valve block (FIG. 1) comprises a frame 2 which provides a plurality, namely 26, of valve stations 3 arranged in one or more, in fact in two, rows.

The frame 2 is rectangular in shape and has a front face 4 and a rear face 6, which provide a front face and a rear face for each valve station.

Figure 2:
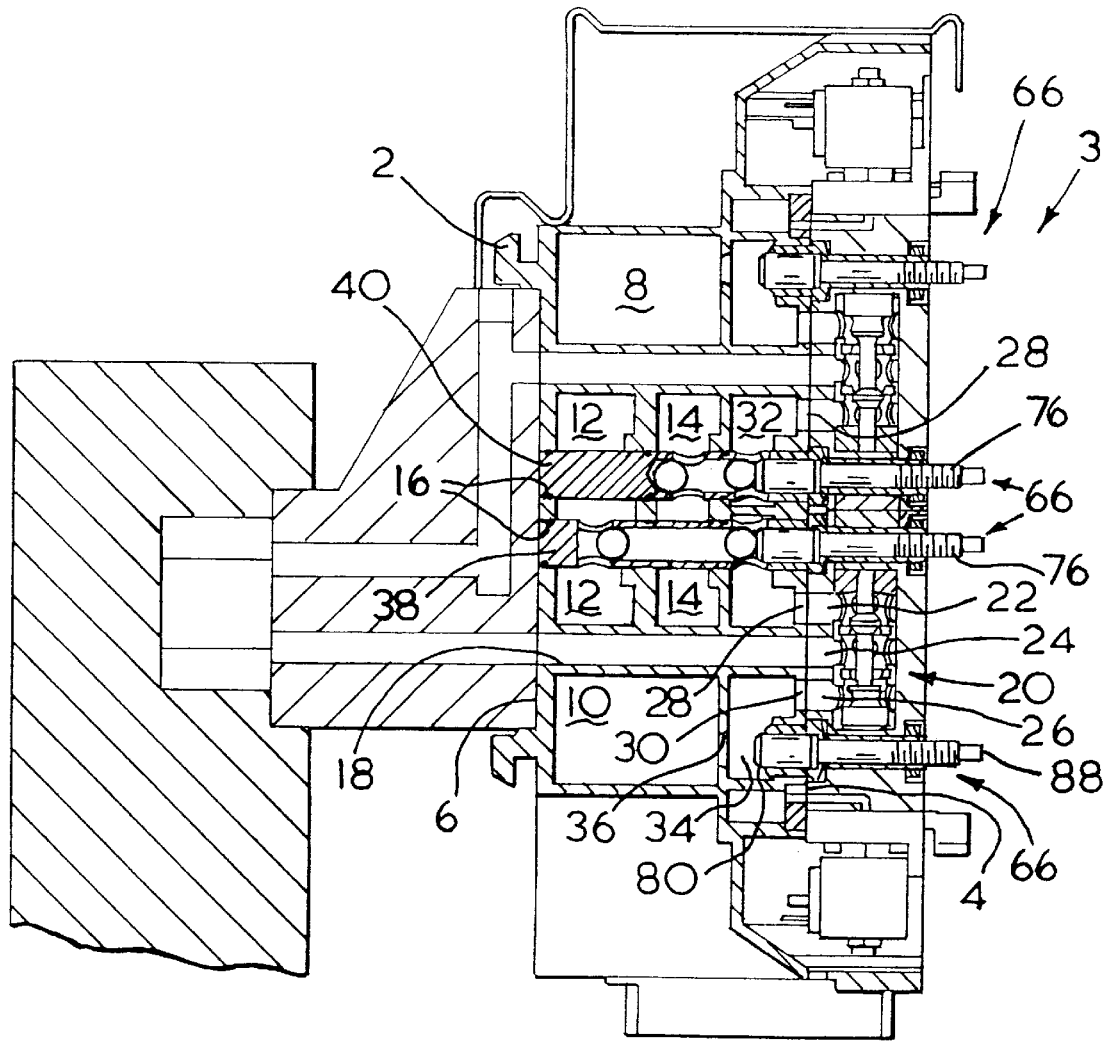
FIG. 2 shows a view of a section taken along the line II—II of FIG. 1.
Figure 5:
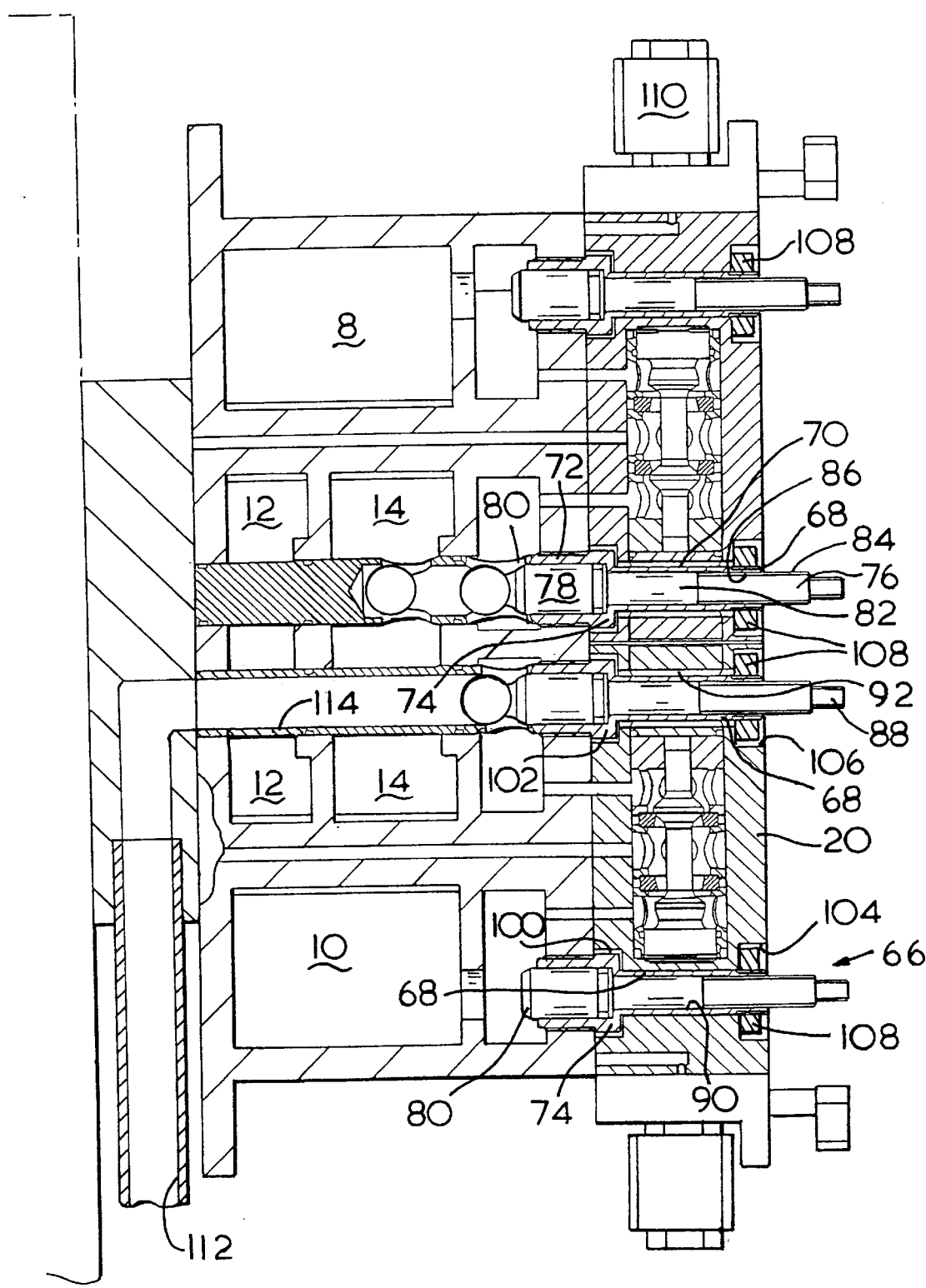
FIG. 5 shows a view similar to FIG. 2 but comprising a different arrangement of control sleeves.

FIGS. 2 and 5 each show a transverse section through two valve stations. The frame 2 comprises extending lengthwise through the frame, two exhaust passages 8 and 10, a first, high, pressure passage 12 and a second, low, pressure passage 14. The exhaust passages 8 and 10 are each associated with the valve stations in separate rows; viewing FIG. 2 the passage 8 extends lengthwise through all the valve stations in the upper row of valve stations, the passage 10 through all the valve stations in the lower row. The passages 12 and 14 each extend through both rows of valve stations.

The lower valve station 3 shown in FIG. 2 will now be described: it will be understood that the construction of each valve station 3 in the lower row is the same so far as the frame 2 is concerned, while the construction of each valve station 3 in the upper row is effectively the same as those in the lower row, being mirror images. The precise configuration of parts associated with the frame at each valve station may differ, as will be explained later.

The lower valve station 3 comprises an inlet passage 16 which extends directly from the rear face 6 to the front face 4 across the two pressure passages 12 and 14. A supply passage 18 also extends from the rear face 6 to the front face 4 of the station.

Associated with the valve station 3 is a pilot air operated control valve 20 which comprises connecting air passages namely an inlet 22, a supply outlet 24 and an exhaust outlet 26. The valve 20 is mounted on the front face 4. The inlet 22 mates with a valve inlet passage 28 of the frame 2, the supply outlet 24 with the supply passage 18, and the exhaust outlet 26 with a valve exhaust passage 30 of the frame 2. The valve inlet passage 28 leads from the face 4 to a chamber 32 which is open to the inlet passage 16. The valve exhaust passage 30 leads from the face 4 to a chamber 34 which opens through an orifice 36 into the exhaust passage 10.

The valve station 3 also comprises a control sleeve in the inlet passage 16 which determines whether the valve inlet passage 28 is connected to the high pressure passage 12 or the low pressure passage 14.

In FIG. 2, the lower valve station 3 has a control sleeve 38 which connects the valve inlet passage 28 of that station to the high pressure passage 12, while the upper valve station 3 has a control sleeve 40 which connects the valve inlet passage 28 of that station to the lower pressure passage 14.

Figure 3:
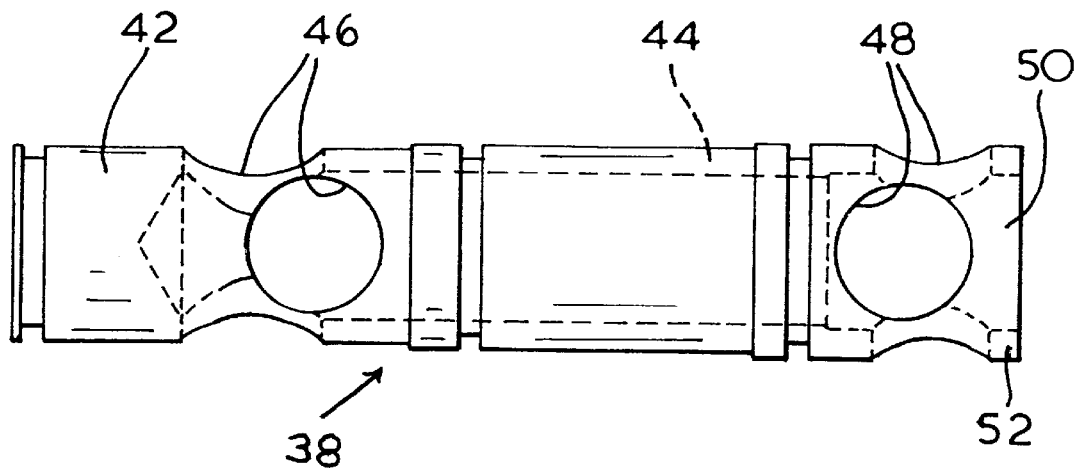
FIGS. 3 and 4 show control sleeves.

The sleeve 38, which may be termed a high pressure sleeve, is shown in FIG. 3. It is tubular in form and comprises a closed end 42 from which extends a cylindrical wall 44 to an open end 50. Four radially spaced entry ports 46 are provided in the wall 44 close to the closed end 42. Similar ports 48 are provided adjacent the open end 50 of the wall 44; the end 50 provides an annular end face 52.

Figure 4:
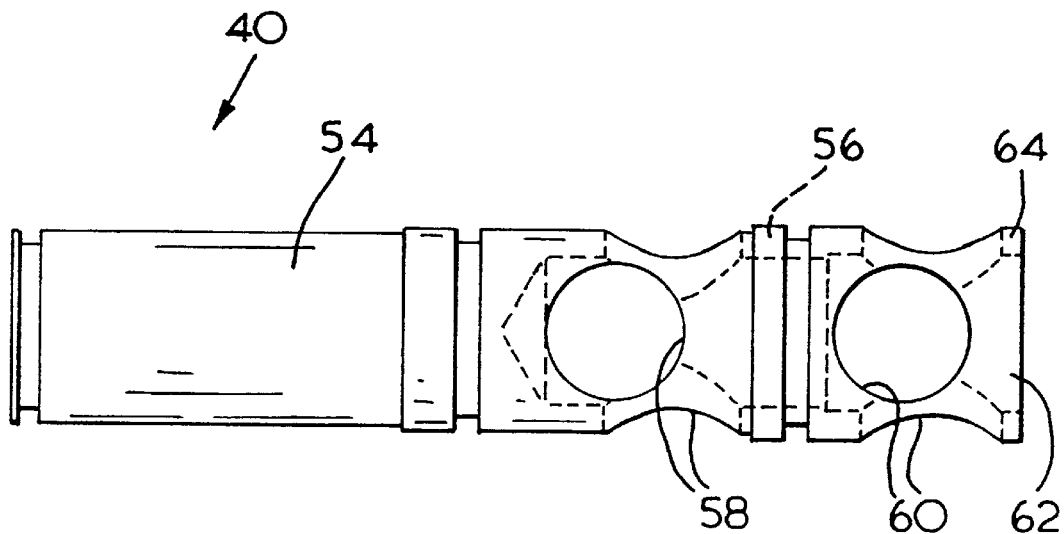

The sleeve 40, which may be termed a low pressure sleeve, is shown in FIG. 4. It resembles the sleeve 38 being tubular in form, and comprises a thick closed end 54 from which a cylindrical wall 56 extends to an open end 62. Radially spaced entry ports 58 are provided in the wall 56, adjacent the closed end 54 and similar entry ports 60 are provided adjacent the open end 62 of the wall 56 which provides an annular end face 64.

The control sleeves are held in position in the frame 2 by stud arrangements 66 mounted on the front face 4 of the valve station 3, (best seen in FIG. 5) which stud arrangements also provide throttle valves.

Each stud arrangement 66 comprises a sleeve 68 comprising a narrower portion 70 and a larger portion 72. The larger portion 72 is provided with a screw thread which extends to a faceted head 74, and the larger portion 72 is screwed into an appropriate screw threaded bore in the front face 4 of the frame 2. A valve member 76 is mounted in the sleeve 68 and comprises a head 78 having a chamfered seating face 80 and mounted for sliding movement in the larger portion 72 of the sleeve 68, and a stem 82 which comprises a threaded portion 84 which engages in an internally threaded portion 86 of the narrower portion 70 of the sleeve 68. The valve members can thus be adjusted in the sleeve 68 by rotation of the members 76, achieved through use of a square head 88.

As can be seen from FIG. 2, the stud arrangement 66 may be used in one of three contexts.

Viewing the lower most stud arrangement 66 shown in FIG. 2, this serves to provide a throttle valve for controlling the passage of air from the chamber 34 through the orifice 36 into the exhaust passage 10. The chamfered face 80 is arranged opposite the orifice 36, and can be brought close to the orifice to restrict the flow of air from the valve 22 through the chamber 34 to exhaust, if required, by adjustment of the face 80 by rotation of the valve member 76.

The next lowest stud arrangement viewing FIG. 2 is associated with a high pressure control sleeve 38. The sleeve 68 of the stud arrangement is screwed into the frame 2 and the end face of the larger portion 72 of the sleeve 68 engages the annular end face 52 of the sleeve 38 to hold the sleeve in place in the inlet passage 16. The head 78 of the valve member 76 is dimensioned to be slidable within the cylindrical wall 44, and thus by adjustment of the position of the valve member 76, specifically of the axial position of the head 78 with respect to the entry ports 48, it is possible to control the rate of flow of air from the high pressure passage 12, through the control sleeve 38 in the inlet passage 16 and out through the ports 48 into the chamber 32.

The next lowest stud arrangement viewing FIG. 2 is associated with a low pressure control sleeve 40, and it can be seen that adjustment of the position of the valve member 76 will control the flow of low pressure air from the low pressure passage 14 through the entry ports 58, through the wall 56 of the control sleeve 40 and out through the ports 60 into a chamber equivalent to the chamber 32.

The stud arrangements 66 also provide for the accurate location of the valves 20 at each valve station. Each valve 20 is provided with two through bores 90, 92 each provided with enlarged end portions 100, 102, 104, 106. The valve 20 is positioned at a valve station by being positioned on two adjacent stud arrangements 66, extending through the bores 90 and 92. The enlarged portions 100 and 104 fit over the faceted heads 74 of the sleeve 68, the bores 90, 92 closely surround the sleeves 68, and the enlarged portions 102, 104 accommodate nuts 108 which are secured on threaded end portions of the sleeves 68 to hold the valve 20 firmly in position.

Each valve 20 is a pilot operated valve controlled by a solenoid operated pilot valve 110.

It can be seen that the valve block just described is highly adaptable and convenient of access. Each valve station 3 can be arranged to control high pressure air, by use of a sleeve 38 or low pressure air, by use of a sleeve 40. If, for example for [Plunger up operating air,] air at a pressure different from that of the main high pressure or low pressure air is required, such air may be provided to the valve block through a dedicated passage 112 (see FIG. 5) and conveyed to the valve at the valve station through a simple sleeve 114 which does not connect to either the high pressure passage 12 or the low pressure passage 14. Thus each valve station may be modified, by variation of the control sleeves, or repaired, by replacement of the valve 20, with access only to one face of the valve block. Further, the stud arrangements 66 allow both the incoming air from the supply and the air passing to the exhaust from the valve 20 to be throttled; this throttling of air passing to exhaust allows conventional check valves to be dispensed with.

I claimed:

1. A valve block comprising:
   a frame which provides a plurality of valve stations arranged in one or more rows, the frame having a front face and a rear face which provide a front face and a rear face of each valve station, said frame also comprising an exhaust passage, a first pressure passage and a second pressure passage all extending lengthwise through all the valve stations in one row,
   and a control valve associated with each valve station, wherein, each said valve station comprises:
      an inlet passage extending from said rear face to said front face of the station across said two pressure passages,
      a supply passage extending from said rear face to said front face of the station,
      a control sleeve in said inlet passage which connects a selected one only of the pressure passages to an inlet of said control valve which control sleeve is accessible from said front face of said valve station,
      and wherein said valve associated with said station is mounted on said front face of said station,
      and throttle valves for controlling the passage of air to said valve from said inlet passage and from said valve to said exhaust passage are also mounted on said front face of said station.

2. A valve block comprising:
   a frame which provides a plurality of valve stations arranged in one or more rows, said frame having a front face and a rear face which provide a front face and a rear face of each valve station, said frame also comprising an exhaust passage, a first pressure passage and a second pressure passage all extending lengthwise through all the valve stations in one row,
   a control valve associated with each valve station and means for connecting the valve to the exhaust passage and selectively to one of the pressure passages wherein,
   each said valve station comprises:
      an inlet passage extending from said rear face to said front face of the station across said two pressure passages,
      a supply passage extending from said rear face to said front face of the station,
      a valve inlet passage extending from the front face of the station and connected to said inlet passage,
      a valve exhaust passage extending from the front face of the station and connected to said exhaust passage,
      a control sleeve in said inlet passage which connects a selected one only of said pressure passages to said valve inlet passage,
   the control valve associated with said valve station being mounted on said front face of said valve station and comprising air passages which mate with the entrances in said front face of said supply passage, said valve inlet passage and said valve exhaust passage.

3. A valve block comprising;
   a frame which provides a plurality of valve stations arranged in one or more rows, said frame having a front face and a rear face which provide a front face and a rear face of each said valve station and said frame also comprising an exhaust passage, a first pressure passage and a second pressure passage all extending lengthwise through all the valve stations in one row,
   and a control valve associated with each valve station, wherein
   each said valve station comprises:
      an inlet passage extending from said rear face to said front face of the station across said two pressure passages,
      a supply passage extending from said rear face to said front face of the station,
      a valve inlet passage extending from the front face of the station and connected to said inlet passage,
      a valve exhaust passage extending from the front face of the station and connected to said exhaust passage,
      a control sleeve in said inlet passage which connects a selected one only of said pressure passages to said valve inlet passage,
      a first stud arrangement mounted on said front face of said station and extending into said inlet passage to hold said control sleeve in position,
      a second stud arrangement mounted on the front face of the station,
      the control valve being located on the two stud arrangements and comprising air passages which mate with the entrances in said front face of said supply passage, said valve inlet passage and said valve exhaust passage.

4. A valve block according to claim 1, wherein the valve stations are arranged in two rows.

5. A valve block according to claim 4, wherein said first and second pressure passages extend through the valve stations in both rows.

6. A valve block according to claim 2, wherein said valve stations are arranged in two rows.

7. A valve block according to claim 6, wherein said first and second pressure passages extend through the valve stations in both rows.

8. A valve block according to claim 2, wherein said control sleeve is accessible from the front face of said valve station.

9. A valve block according to claim 3, wherein said valve stations are arranged in two rows.

10. A valve block according to claim 9, wherein said first and second pressure passages extend through the valve stations in both rows.

11. A valve block according to claim 2,
    comprising throttle valves for controlling the passage of air to said control valve from said inlet passage and from said control valve to said exhaust passage, said throttle valves being mounted on said front face of said station.

12. A valve according to claim 2, comprising a first stud arrangement mounted on said front face of said station and extending into said inlet passage to hold said control sleeve in position, and a second stud arrangement mounted on said front face of said station.

13. A valve according to claim 12, wherein said first stud arrangement provides a throttle valve for controlling the passage of air from said inlet passage to said control valve, and said second stud arrangement provides a throttle valve for controlling the passage of air from said control valve to said exhaust.

14. A valve block according to claim 3, wherein said first stud arrangement comprises a control face which can be adjusted with respect to said control sleeve, thus to provide a throttle valve.

15. A valve block according to claim 14, wherein said second stud arrangement comprises a control face which can be adjusted with respect to an inlet hole in a wall of said exhaust passage, thus to provide a throttle valve.

16. A valve block comprising:
- a frame including
  - front and rear vertical faces,
  - horizontally adjacent first, second and third passages extending horizontally parallel to said front and vertical faces,
  - a fourth passage, vertically spaced from said first, second and third passages and extending horizontally parallel to said front and rear vertical faces,
  - a supply passage extending from said rear face to said front face of said frame between said forth passage and said first, second and third passages, and
  - a hole extending from said rear face to said front face, said hole communicating with each of said first, second and third passages,
- a vertical valve housing having a rear vertical face engaging said fron vertical face of said frame and a front face, said valve housing housing a vertical two position cartridge valve having three vertically stacked inlet portions,
- a hole extending from said front face to said rear face of the valve housing defining with said frame hole a continuous hole,
- a control sleeve located within said continuous hole for connecting either said first and second passage to said third passage, said control sleeve including a stud portion accessible from said front face of said valve station, and a first conduit extending from said third passage to one of said cartridge valve inlet portions through said frame and valve housing, a second conduit in said valve housing for connecting said inlet passage to a second one of said cartridge valve inlet portions, and a third conduit extending from said fourth passage to the third of said cartridge valve inlet portions through said frame and valve housing, whereby when said cartridge is displaced to a first position said first conduit will be connected to said inlet passage and when said cartridge is displaced to a second position, said first conduit will be connected to said forth passsage.

17. A valve block according to claim 16, wherein a plurality of horizontally spaced holes extend from said rear face of said frame to said front face of said fram, each of said holes communicating with each of said first, second and third passages, wherein there are a corresponding plurality of valve housings each having a cartridge valve and a hole extending from the front face to the rear face of the valve housing defining with a corresponding one of said frame holes a continuous hole, wherein a control sleeve is located within each of said continuous holes for connecting either said first and second passage to said third passage, wherein each of said control sleeves includes a stud portion accessible from said front face of said valve station, wherein a first conduit extends from said third passage to each one of said cartridge valve inlet portions through said frame and a corresponding valve housing, wherein a second conduit in each of said valve housings connects a corresponding one of said inlet passages to a second one of the cartridge valve inlet portion, and wherein a third conduit extends from said fourth passage to the third of said cartrige valve inlet portion of each of said valve housings through said frame and valve housing.

* * * * *